(12) United States Patent
Keller et al.

(10) Patent No.: US 6,304,850 B1
(45) Date of Patent: Oct. 16, 2001

(54) COMPUTER-IMPLEMENTED SYSTEM AND METHOD FOR BOOKING AIRLINE TRAVEL ITINERARIES

(75) Inventors: Brett Keller, Ridgefield; Scot Melland, New Canaan; Martin Isaac, Trumbull, all of CT (US); Gary LaRoy, Old Hickory, TN (US); Mark Krueger, Mesa, AZ (US)

(73) Assignee: Netmarket Group, Inc., Stamford, CT (US)

( * ) Notice: Subject to any disclaimer, the term of this patent is extended or adjusted under 35 U.S.C. 154(b) by 0 days.

(21) Appl. No.: 09/271,356

(22) Filed: Mar. 17, 1999

(51) Int. Cl.[7] .................................................. G06F 17/60
(52) U.S. Cl. ...................................... 705/5; 705/6; 705/26
(58) Field of Search .................................. 705/5, 6, 8, 9, 705/26, 27

(56) References Cited

U.S. PATENT DOCUMENTS

| | | | |
|---|---|---|---|
| 4,449,186 | * | 5/1984 | Kelly et al. ................................. 705/5 |
| 4,931,932 | | 6/1990 | Dalnekoff et al. . |
| 5,021,953 | | 6/1991 | Webber et al. . |
| 5,253,165 | | 10/1993 | Leiseca et al. . |
| 5,331,546 | | 7/1994 | Webber et al. . |
| 5,724,520 | | 3/1998 | Goheen . |
| 5,727,165 | * | 3/1998 | Ordish et al. ............................. 705/37 |
| 5,732,398 | * | 3/1998 | Tagawa ....................................... 705/5 |
| 5,752,238 | | 5/1998 | Dedrick . |
| 5,758,328 | | 5/1998 | Giovannoli . |
| 5,761,648 | | 6/1998 | Golden et al. . |
| 5,794,207 | | 8/1998 | Walker et al. . |
| 5,797,127 | | 8/1998 | Walker et al. . |
| 5,832,453 | | 11/1998 | O'Brien . |
| 6,026,403 | * | 2/2000 | Siefert ....................................... 707/10 |
| 6,041,308 | * | 3/2000 | Walker et al. ............................ 705/14 |
| 6,134,534 | * | 10/2000 | Walker et al. ............................ 705/26 |

FOREIGN PATENT DOCUMENTS

| | | | |
|---|---|---|---|
| 410040462 | * | 2/1998 | (JP) . |
| 411031186 | * | 2/1999 | (JP) . |
| WO 9724833 A | * | 7/1997 | (WO) . |

OTHER PUBLICATIONS

Boudreaux et al., "The fast changing world of the Internet", Management quarterly, v40n2, p: 2–19, 1999.*

* cited by examiner

Primary Examiner—Eric W. Stamber
Assistant Examiner—Hani Kazimi
(74) Attorney, Agent, or Firm—Rothwell, Figg, Ernst & Manbeck

(57) ABSTRACT

A method and apparatus for purchasing an airline ticket, includes entering into a computer information describing a flight desired by a consumer, including a target price, and performing a search on an airline reservation system database for flights corresponding to the desired flight information. The method determines whether a flight found during the search has a fare that is at least equal to the target price, and if so books the flight to hold it for the consumer for a predetermined period of time to allow the consumer to effect payment. The consumer is informed by e-mail notification of the seat reservation and instructing the consumer regarding payment requirements to effect purchase of the airline ticket. If a flight having the target price or better is not found, the method continues to periodically perform the search over a predetermined number of days into the future, and inform the consumer by e-mail of the ongoing results of the search.

14 Claims, 8 Drawing Sheets

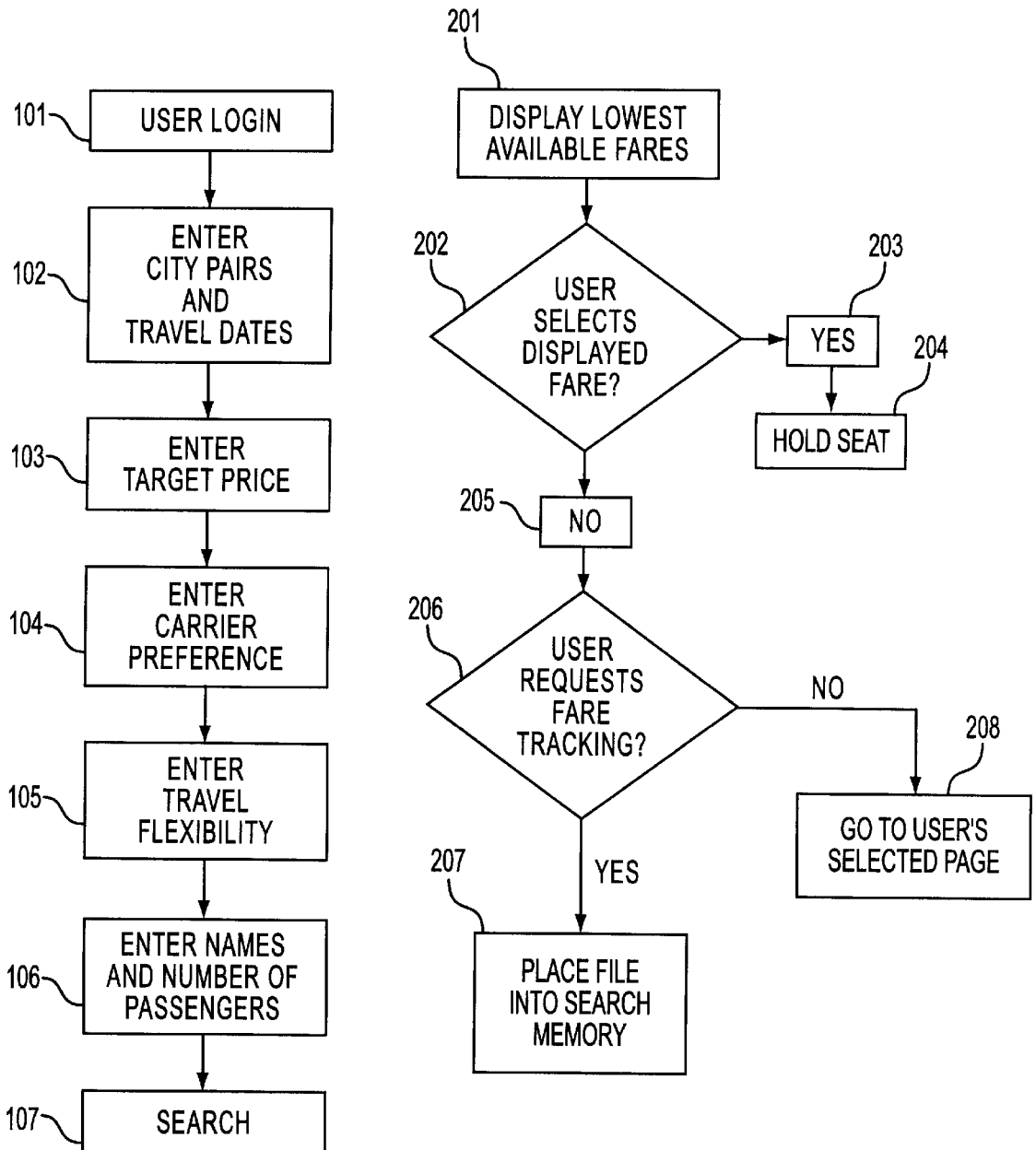

COMPUTER-IMPLEMENTED SYSTEM AND METHOD FOR BOOKING AIRLINE TRAVEL ITINERARIES

BACKGROUND OF THE INVENTION

1. Field of the Invention

The present invention generally relates to interactive computer systems, such as interactive Web sites on the Internet. In particular, the invention relates to a computer-implemented system and method for enabling on-line customers to purchase airline travel tickets at the best possible price.

2. Description of the Background Art

There are known in the art interactive travel services on the Internet that allow consumers to purchase airline travel tickets on-line. Typically, such services require the consumer to input to the travel service server information regarding the origination and destination cities, dates and approximate times of departure, and optionally a preferred carrier. The travel service then carries out a search on a commercial on-line airline reservation system such as Apollo or SABRE.

The service then displays to the user a list of flights for which seats are listed as being available at that time, together with the fares for such flights. The user then has the option of purchasing a selected flight from the list, either by transmitting to the service credit card information over the Internet, by calling a telephone number or possibly by transmitting payment information by facsimile.

A system is also known whereby a consumer can specify a price at which she is willing to purchase an airline ticket for travel between designated cities. In order to make use of this service, however, the consumer must be willing to make an irrevocable offer, with the possible result that the consumer may have to accept tickets for a flight schedule and time of departure that may be inconvenient or less than desirable. Once a carrier has accepted the consumer's offer, the fare is automatically charged to the consumer's credit card and the consumer is not able to cancel or to receive a refund. As such, the consumer may be stuck with tickets for a flight that is inconvenient, with a carrier that the consumer may wish to avoid, or in a worst case, for a flight at a time that the consumer cannot travel because of unexpected intervening events. Conversely, if the consumer's offer is rejected by all airlines, the request is canceled and the consumer must go through the entire data entry process again to initiate another request.

Many Internet travel services also provide an e-mail service through which subscribers are regularly notified of so-called "lowest fares" available for flights between specified city pairs. However, such fares typically represent the lowest published fares as published in airline tariffs, and do not represent fares actually available on particular flights. As such, it is common that when the consumer accesses an Internet travel service website in response to such an e-mail notification, she will not be able to purchase any tickets for the so-called "lowest published fare" on any actual flight.

There remains a need in the art for an interactive travel service that not only allows the consumer to set her own price for airline travel, but once such a flight is found, gives the consumer the freedom to make a final decision as to whether to actually purchase the airline 10 tickets within a certain time frame.

SUMMARY OF THE INVENTION

The present invention solves the existing need by providing a method of purchasing an airline ticket, including the steps of entering into a computer information describing a flight desired by a consumer, including a target price, performing a search on an airline reservation system database for flights corresponding to the desired flight information, determining whether a flight found during the search has a fare that is at least equal to the target price, automatically booking a flight found to be at least equal to the target price to thereby reserve a seat on said flight, and informing the consumer of the seat reservation and instructing the consumer regarding payment requirements to effect purchase of the airline ticket.

According to a second aspect, the invention provides apparatus for purchasing an airline ticket that implements the abovementioned method.

According to a third aspect of the invention, the invention provides a method of purchasing an airline ticket, including the steps of entering into a computer information describing a flight desired by a consumer, including a target price, performing a search on an airline reservation system database for flights corresponding to the desired flight information, determining whether a flight found during the search has a fare that is at least equal to the target price, when no flights having fares at least equal to the target price have been found, periodically performing the search over a predetermined number of days, and informing the consumer of the results of each search. In a preferred embodiment, the notification is transmitted to the consumer by e-mail.

BRIEF DESCRIPTION OF THE DRAWINGS

The invention will become more clearly understood from the following detailed description in connection with the accompanying drawings, in which:

FIG. 1 is a flow diagram of a user login procedure according to one embodiment of the invention;

FIG. 2 is a flow diagram of a process for presenting fare search results to the user;

DETAILED DESCRIPTION OF THE PREFERRED EMBODIMENTS

Figure 5:
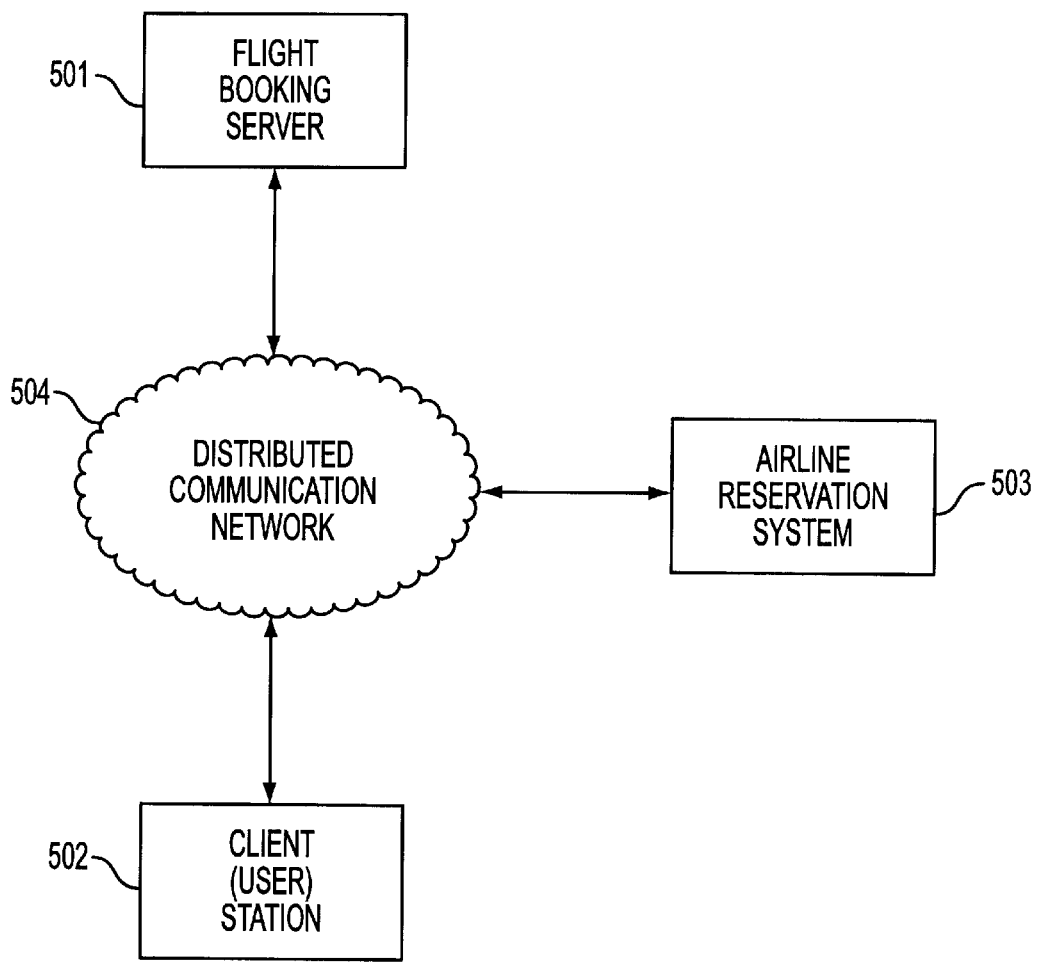
FIG. 5 is a block diagram of a distributed communication network system according to the invention.

Referring to FIG. 5, a system according to one preferred embodiment of the invention includes a flight booking server 501, a client station 502, a commercial airline reservation database system 503, and a distributed communication network 504. According to one preferred embodiment, network 504 is the Internet, and server 501 contains a URL on the World Wide Web. Client station 502 may be a desktop computer, notebook computer, workstation, minicomputer, or other similar type of computer. Server 501 preferably is a multiple line Internet server of a type that is commercially available.

Airline reservation system 503 may be one of a number of professional information database providers, such as SABRE or Apollo. Such databases compile, among other things, airline travel information for all major carriers, including routes, timetables, fares, tariffs and associated rules and restrictions. The airline reservation system 503 is accessed by formulating searches in a predetermined format that is compatible with the search engine commands of the system. The format and commands of the system will be known to those skilled in the art and thus no further explanation will be provided here.

Referring to FIG. 1, a consumer wishing to purchase airline travel tickets "logs in" to the server, such as by inputting the URL of the booking server on the consumer's Web browser, at step 101. At this time, the consumer or user will be presented with a web page containing spaces for information to be entered by the user. At step 102, the user enters as basic request data the departure and destination cities, along with the dates of departure and return. At step 103, the user enters a target price, representing the fare that the user would like to pay for the tickets. After this preliminary data entry, at step 104 the user may enter a carrier preference, or may indicate no preference among airlines by requesting the booking server to search among all air carriers for the best fare.

At step 105, the user may indicate whether her travel plans are flexible, such that the user may depart or return from one to three days before or after the entered travel dates. If the user's plans are flexible, the user will indicate whether the flexibility is respect to the date of departure or date of return, and will indicate the number of days either before or after the inputted date of travel. If the user is not flexible, the user will enter "not flexible" in the appropriate line on the web page.

At step 106, the user enters the number and names of additional accompanying passengers, if any, and at step 107, the user requests the booking server to initiate a search for a flight meeting the entered information, which is at or below the user's indicated target price. The booking server also requests the user to input address, telephone and e-mail address information for booking and future communication purposes.

As will be described in detail below, the booking server next generates a search entry and transmits it to the airline reservation system, and receives a return itinerary representing the results of the search. As shown in FIG. 2, in the event that the search failed to uncover a flight meeting the user's specifications that is at or below the user's target price, the lowest available fares are displayed at step 201. The number of fares displayed can be any number, sorted from lowest to highest fare; in the preferred embodiment the two lowest fares are displayed. The user is then given the opportunity to request the booking server to try to hold a seat or seats at one of the displayed fares, at step 202. If the user decides to accept one of the fares by clicking on the appropriate link at step 203, the booking server will book the itinerary at step 204. This will in effect hold the seats for the user for a certain period of time, usually 24 hours, during which the user must actually purchase the tickets. If the user fails to purchase the tickets, the booking is canceled.

If the user does not want to book the flight at the displayed fare, the user clicks on the appropriate link at step 205. The booking server at step 206 then asks the user whether she wishes for the booking server to continue to search for fares meeting or beating the target price. If the user indicates that continued searching is desired, the itinerary and target price file is placed into a search memory at step 207. Otherwise, at step 208, the user clicks on one of a number of alternate links and is taken to the page specified by the link.

Various possible search configurations and result analyses according to the present invention will be described with reference to FIGS. 3A–3D. Step 3001 represents the situation where the user has not specified any preferred carrier, and has indicated no flexibility regarding the travel dates. At step 3002, the booking server creates an "open segment," which is a shell itinerary entry that serves as a template for the fare search engine of the reservation system. The booking server will create an open segment for each leg of the user's trip. At step 3002, the booking server generates a "BFP" entry with optional generic qualifiers. BFP stands for "Bargain Finder Plus." Bargain Finder Plus is a suite of commands that allow the SABRE reservation system to evaluate a specific travel request to determine the lowest price itinerary for a given set of travel qualifications. A BFP entry is a SABRE fare search engine entry that searches over 1000 travel options to determine the lowest priced alternatives for scheduled flights, based on the specific criteria contained in the open segment and from additional qualifiers, if any, contained in the entry. BFP allows a user or a robotic agent to perform the search taking into account times of day, flight availability, carrier preference, multi-airport cities and connection cities.

Generic qualifiers may include entries such as negative biases for airlines which the booking server has placed on a "stop sell" list, either because they are in questionable financial condition or have not conducted business in a consumer-friendly manner. Qualifiers may also include positive biases for booking server-preferred carriers. Use of booking server-preferred carrier qualifiers enables the booking server to look deeper into the carrier's schedules to locate the lowest possible fares.

At step 3004, the BFP entry is transmitted to the airline reservation system search engine. The search engine uses the BFP entry to search the airline schedule database, and returns the search results to the booking server.

At step 3005, the booking server will transmit a "fare shop" entry to the search engine. A fare shop entry is an airline reservation system entry that identifies the lowest published fare for a given itinerary, regardless of applicability to the specified dates of travel or actual availability of fares. The fare shop entry returns a "best case" price that typically would have many conditions and restrictions attached to it. The fare shop search results also are returned to the booking server.

At step 3006, the booking server determines the two lowest fares from the returned BFP search results, by filtering the results first by fare and then by booking server preferred/non-preferred carrier status. The fare shop results are then filtered by eliminating negative-bias carriers or those carriers who have published fares but who do not have any present service for the market. The lowest resulting published fare is then retained as the fare shop search result.

Figure 3A:
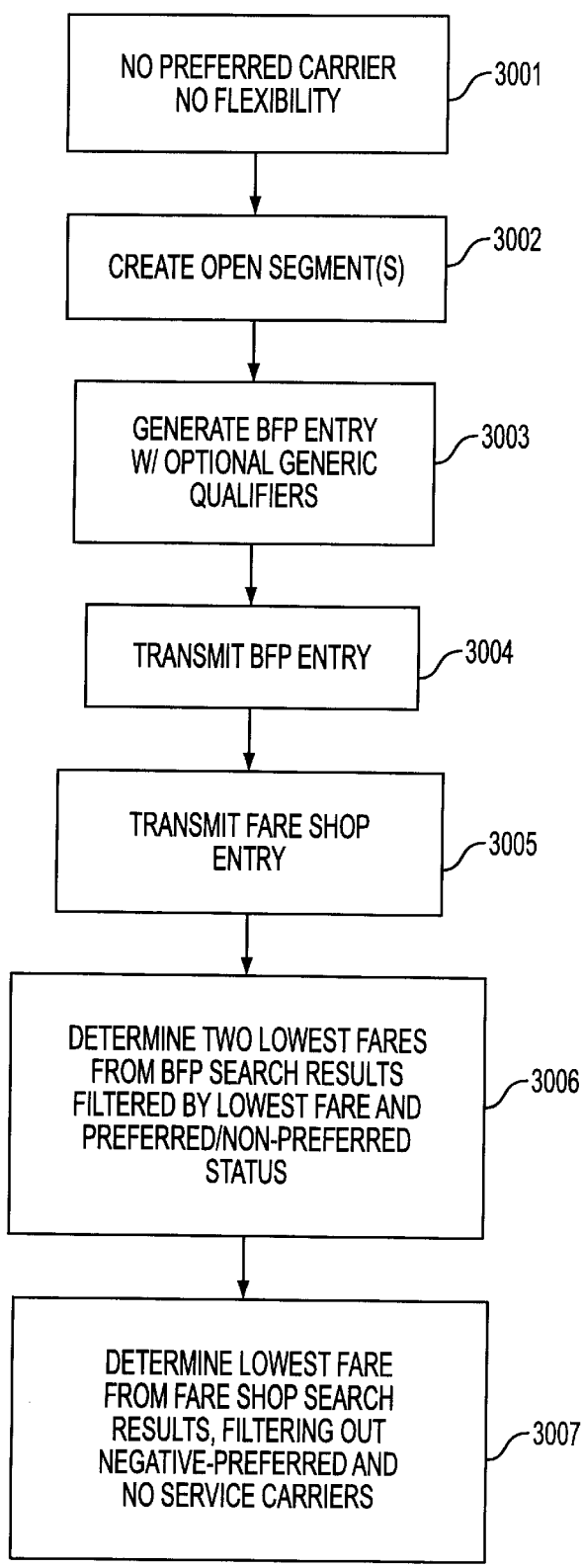
FIGS. 3A–3D are flow diagrams of alternate fare search requests and search result determinations, depending upon user preferences and flexibility.
Figure 3B:
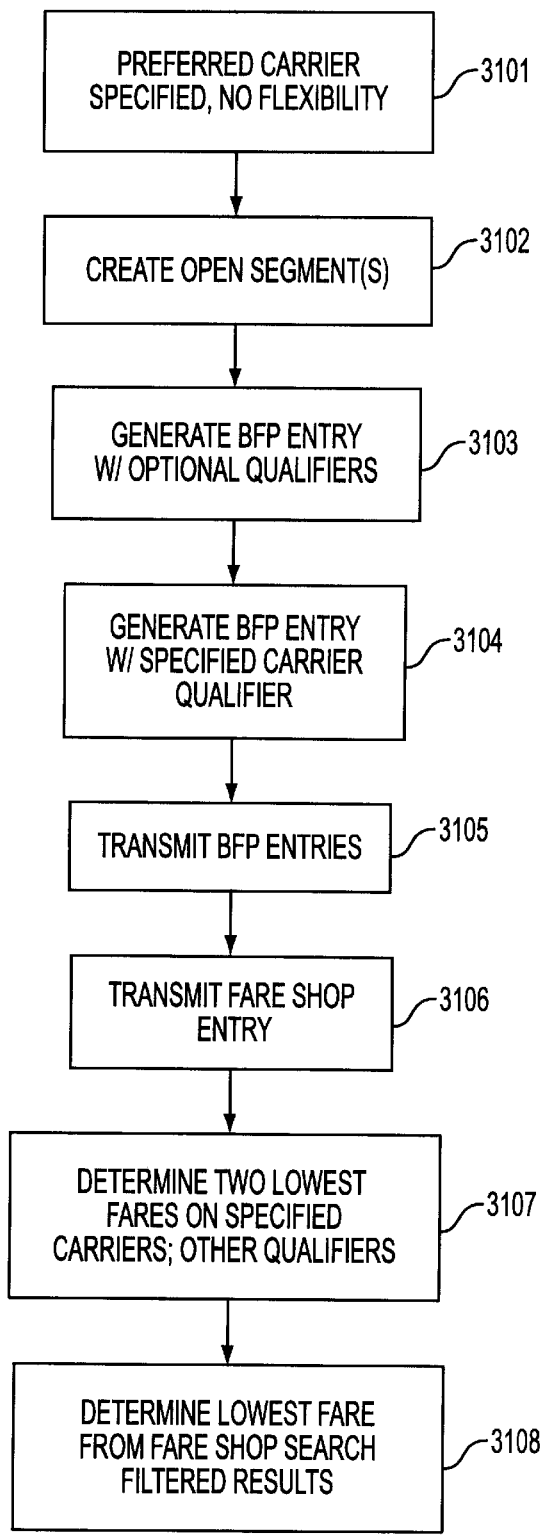

FIG. 3B illustrates the process for the situation, represented at step 3101, where the user has specified a preferred carrier, and has indicated no flexibility in travel dates. Open segments are created at step 3102 and BFP entries are generated at step 3103, similar to FIG. 3A. At step 3104, the booking server generates a BFP entry containing the open segment and having as a qualifier the preferred carrier or carriers specified by the user. At step 3105 the BFP entries are transmitted to the fare search engine of the airline reservation system, and at step 3106 a fare shop entry for the open segment is transmitted to the search engine.

At step 3107, the booking server determines, from the return BFP entries, the lowest airfares available among the user's specified preferred carriers, and the lowest airfares available for all carriers (filtered for negative bias and other generic qualifiers as appropriate). At step 3108, the lowest published fare is determined from the fare shop search results, filtered for negative-bias carriers and carriers with published fares but with no service in the market.

Figure 3C:
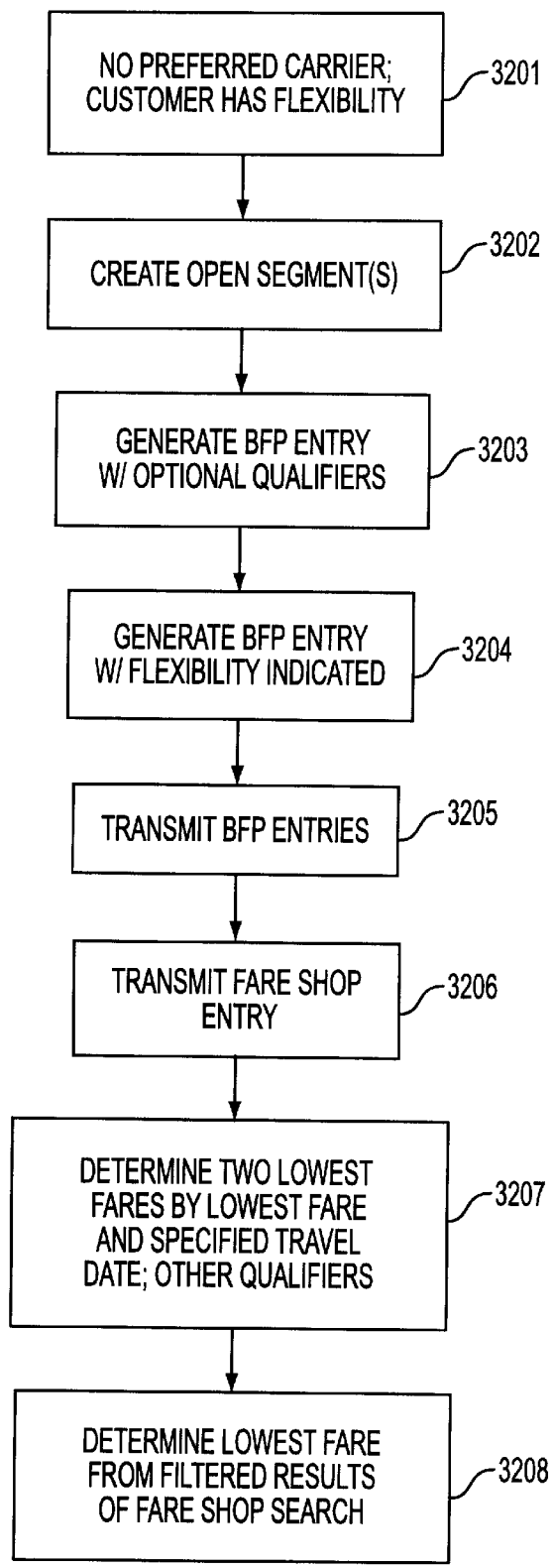

Referring to FIG. 3C, step 3201 represents the situation where the user has not specified any preferred carrier and has indicated flexibility in the entered dates of travel. At step 3202, open segments are created as above. At step 3203, BFP entries are generated using the open segments and optional qualifiers, such as negative carrier bias or booking server-preferred carrier bias. At step 3204, BFP entries are generated with the consumer's flexibility in travel dates indicated. The BFP entries are transmitted to the airline reservation system search engine at step 3205, and a fare shop entry is transmitted at step 3206. In this instance, the booking server at step 3207 determines the two lowest fares from the return BFP entries, based first on fare, then on preferred date of travel, and then by booking server-preferred/non-preferred carrier. At step 3208, the lowest published fare is determined from the return fare shop entry, as above.

Figure 3D:
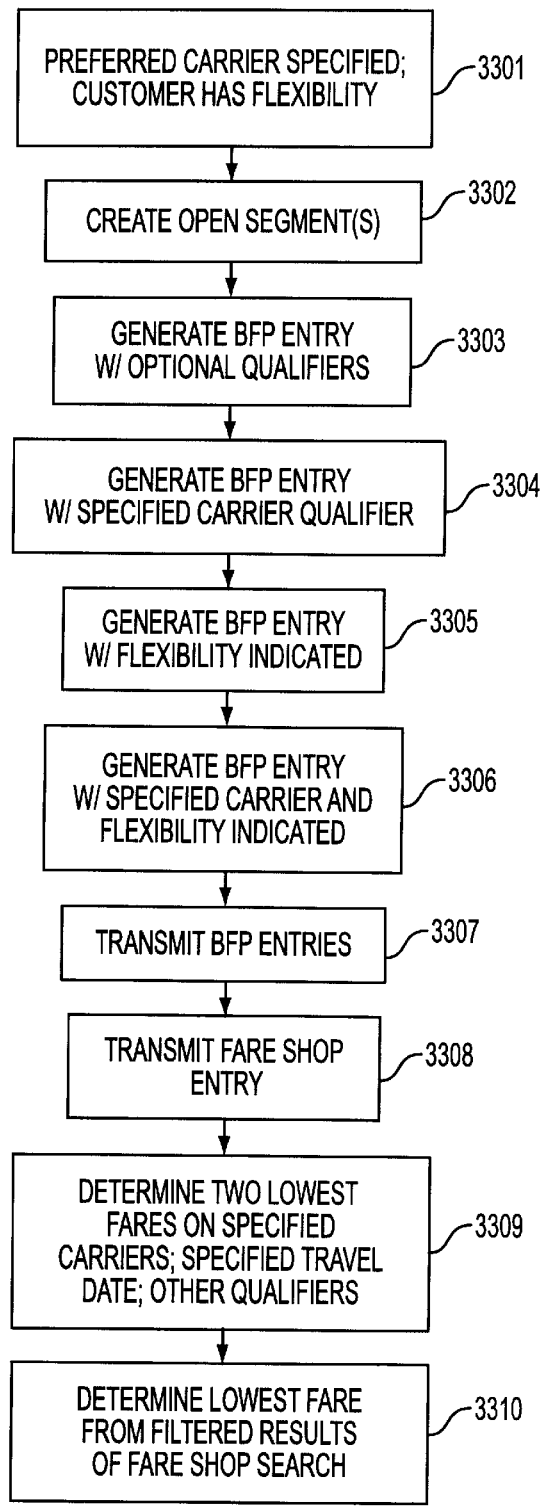

Step 3301 in FIG. 3D represents the case where the user has specified a preferred carrier, and has indicated flexibility in travel dates. Open segments are created at step 3302, and generic BFP entries with optional qualifiers are generated at step 3303. At step 3304, BFP entries are generated contained the user's specified carrier as a qualifier, at step 3305, BFP entries are generated with the user's flexibility indicated, and at step 3306 BFP entries are generated with the specified carrier as a qualifier and the user's flexibility indicated. The BFP entries are transmitted to the airline reservation system search engine at step 3307, and the fare shop entry is transmitted at step 3308.

The search results in the form of return BFP entries and return fare shop entries are received by the booking server, and at step 3309 the booking server determines the two lowest fares based on the lowest airfare available on the user's preferred carrier, the lowest airfare available on the user's preferred carrier on the specified travel dates, and the lowest airfare available for all carriers (subject to the negative-bias qualifier placed in the BFP entry). At step 3310, the lowest published fare is determined from the return fare shop entry, as explained above.

Figure 4:
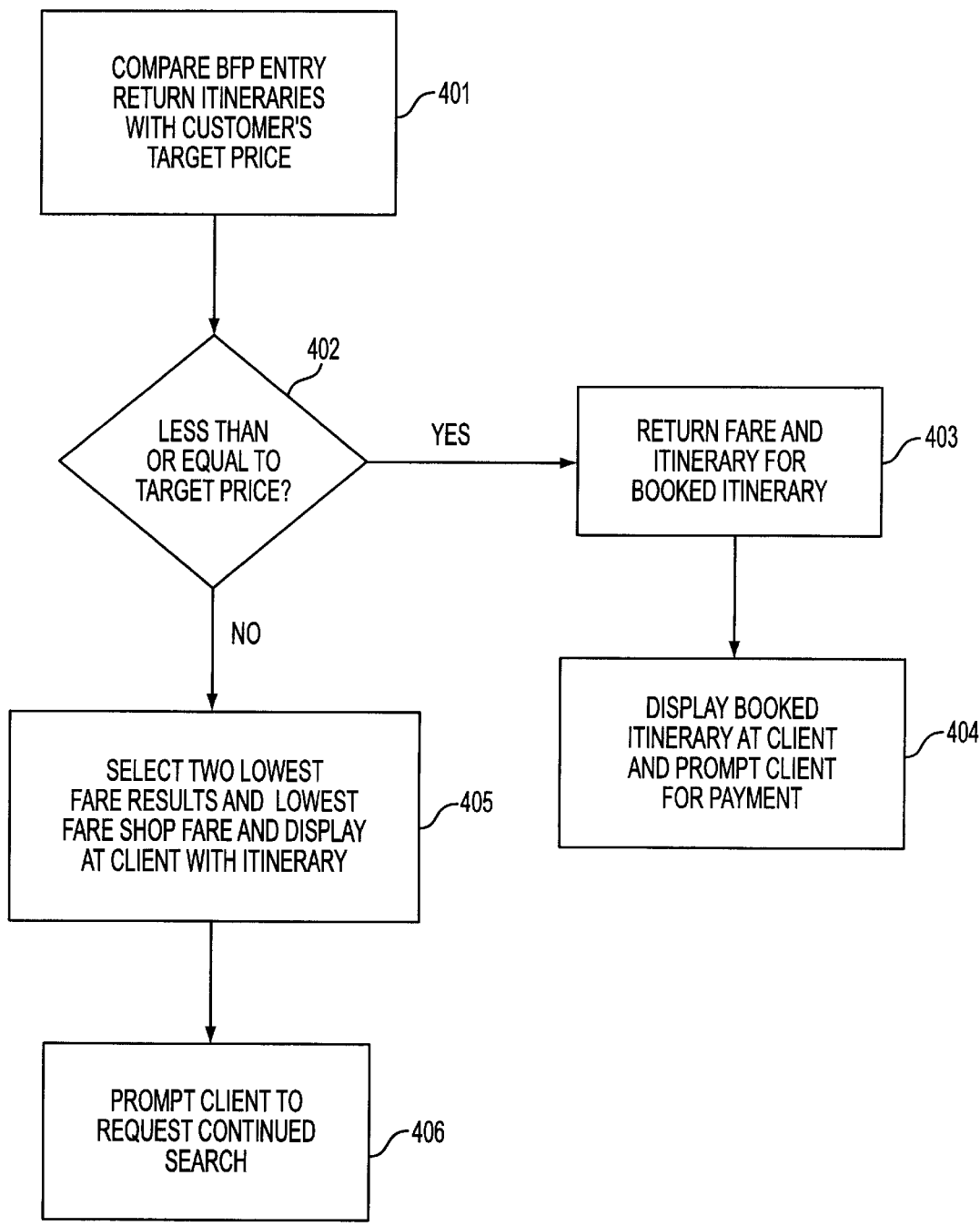
FIG. 4 is a flow diagram of a process for determining whether to book a return itinerary or to ask the user to request a continued search.

FIG. 4 illustrates a process for acting on the lowest fare results determined in FIGS. 3A–3D, according to a preferred embodiment of the invention. At step 401, the BFP entry return itineraries are compared with the consumer's target price. At step 402, it is determined whether the lowest airfares (as determined in FIGS. 3A–3D) are less than or equal to the consumer's inputted target price. If so, at step 403 the booking server returns the fare and itinerary to the airline reservation system for a booked itinerary, providing the consumer's identification information as required. At this point, the seats are held for the consumer for a predetermined period of time, such as 24 hours, during which the consumer must make payment. At step 404, the booking server displays the booked itinerary to the consumer at the client station, and prompts the client for payment. Payment may be effected by directing the consumer to call an 800 number, or in the alternative may present the consumer with the option of entering credit card information over the Internet (preferably through a secure site using encrypted communication).

If the search results fail to find an airfare that meets or is lower than the consumer's target price, the booking server at step 405 selects the two lowest fares and the lowest fare shop fare (i.e., published fare), and displays them along with the itinerary to the consumer. The server at step 406 then prompts the consumer (client) as to the consumer's desire to have the server keep searching for possible lower airfares for the subject itinerary.

According to the invention, the server will store the consumer's itinerary together with the consumer's personal information including the consumer's e-mail address, and will request additional searches for a predetermined number of days subsequent to the original search. It is well known in the airline industry that changes in flight fares, conditions, restrictions, etc. are made daily and literally tens of thousands (or more) of fare changes are made and published each day.

Figure 6:
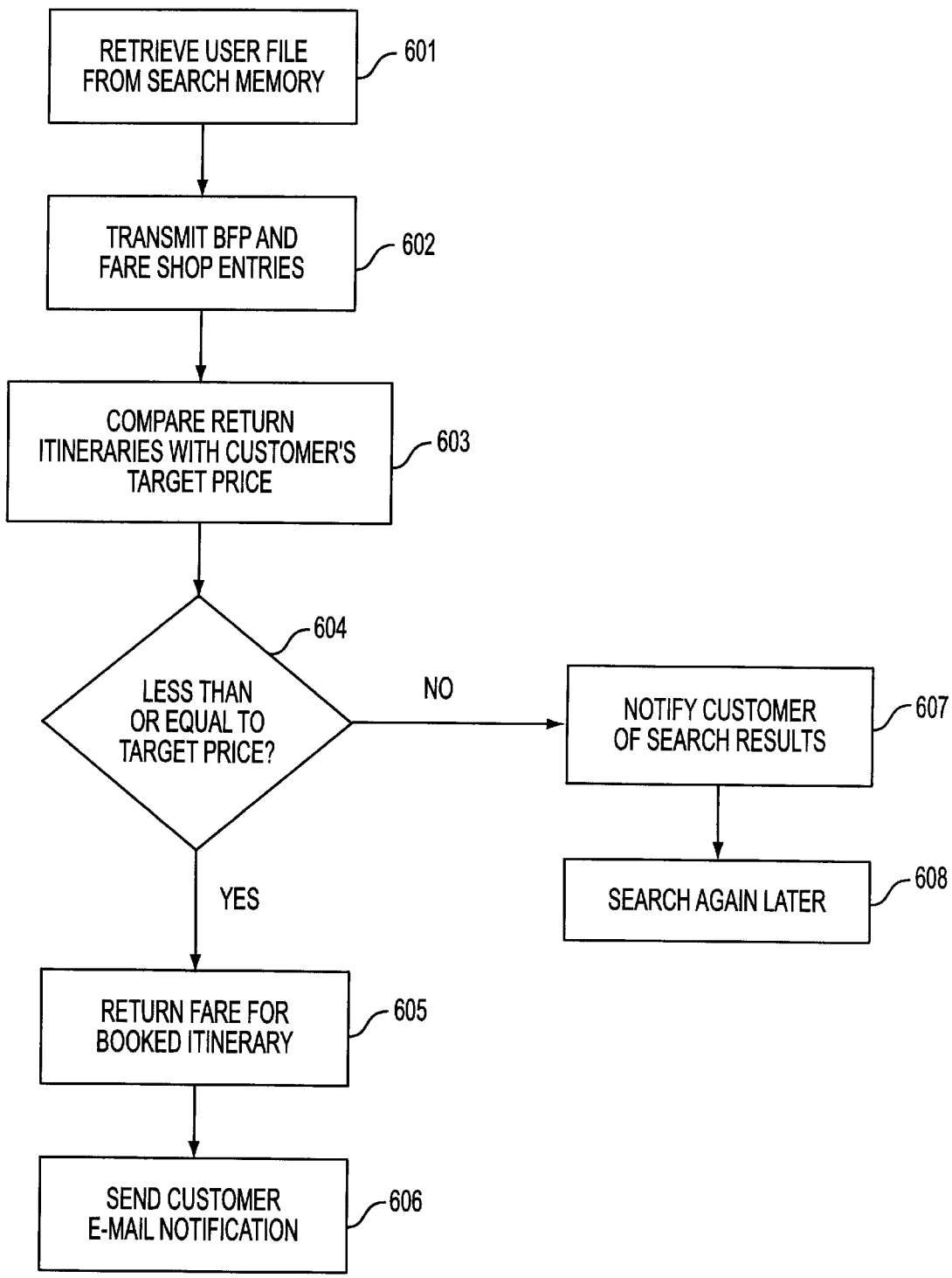
FIG. 6 is a flow diagram of a process for carrying out continuing fare searches according to one embodiment of the invention.

According to the procedure shown in FIG. 6, at step 601, stored user itinerary files are retrieved from a search memory storage area in the booking server. Such files are those for which consumers have requested additional searching. The files may be stored with the date of the original search, so that upon retrieval that date is compared with the present date to determine whether to continue the search or to discard the file.

Assuming the search should proceed, at step 602 the BFP and fare shop entries are transmitted to the airline reservation system search engine as disclosed above. At step 603, the return results are compared with the consumer's target price. If there exists an airfare less than or equal to the consumer's target price as determined at step 604, the fare is returned to the reservation system for a booked itinerary, which thereby reserves the seat for the consumer for a predetermined period of time. At step 605, the booking server immediately sends the consumer an e-mail message notification that an airfare meeting the consumer's target price has been found, and provides the consumer with instructions for purchasing the tickets in the event that the consumer still wishes to do so.

If the search results still fail to return an airfare meeting the consumer's target price, at step 607 the server will notify the consumer by e-mail of the search results, including the lowest available fares found during that search, and at step 608 the booking server will return the consumer's file to storage for performing another search the next day, until the predetermined number of days have expired. According to a preferred embodiment of the invention, the search is carried out for seven consecutive days; however, any other number of days may be chosen during which to carry out the search. In this manner, the present invention provides a system and method whereby a consumer can be assured that a seat on an actual flight will be reserved if a fare is found that meets the consumer's target price. This represents a significant advance in the art over existing e-mail travel notification services which simply inform the consumer of the lowest published fares for a given itinerary, which may bear no relationship to available fares on actual flights.

As a corollary to the invention, a service may be provided wherein the server accepts a user's travel dates, city pair, times, carrier preference, e-mail address, and preferred day of e-mail delivery, and perform scheduled searches over a predetermined period of time (for example, once a week for one month) to find the lowest available fare and lowest published fare, and deliver the search results to the user by e-mail. In this way, the user will gain a better recognition of the direction, magnitude, and frequency of fare changes over an extended period of time, and thus will be able to set a more realistic target price for a flight when the user desires to have the server actually hold a seat once the target price (or better) has been found.

The invention having been described, it will be apparent to those skilled in the art that the same may be varied in many ways without departing from the spirit and scope of the invention. Any and all such modifications are intended to be included within the scope of the following claims.

What is claimed is:

1. A method of purchasing an airline ticket, comprising the steps of:

entering into a computer information describing a flight desired by a consumer, including a target price;

performing a search on an airline reservation system database for flights corresponding to said desired flight information;

determining whether a flight found during the search has a fare that is at least equal to said target price;

automatically booking a flight found to be at least equal to said target price to thereby reserve a seat on said flight, prior to informing the consumer of the availability of the found flight; and informing the consumer of the seat reservation and instructing the consumer regarding payment requirements to effect purchase of the airline ticket.

2. The method of claim 1, wherein the step of entering comprises the step of entering a preferred carrier, and the step of searching comprises the step of qualifying the search with the preferred carrier.

3. The method of claim 1, wherein the step of entering comprises the step of indicating flexibility in dates of travel, and the step of searching comprises the step of broadening the search to encompass the indicated flexibility.

4. The method of claim 1, further comprising the step of continuing the step of searching for a predetermined number of days when a first search has failed to find a flight that is at least equal to said target price, and performing the steps of automatically booking and informing the consumer when a such a flight is found during a continued search.

5. The method of claim 1, wherein the step of informing comprises sending an e-mail notification to the consumer.

6. The method of claim 1, wherein said computer is a server on the Internet.

7. Apparatus for purchasing an airline ticket, comprising:

a computer for receiving information describing a flight desired by a consumer, including a target price; and a program in said computer for performing a search on an airline reservation system database for flights corresponding to said desired flight information;

said program determining whether a flight found during the search has a fare that is at least equal to said target price;

said program automatically booking a flight found to be at least equal to said target price to thereby reserve a seat on said flight, prior to informing the consumer of the availability of the found flight; and said program informing the consumer of the seat reservation and instructing the consumer regarding payment requirements to effect purchase of the airline ticket.

8. The apparatus of claim 7, wherein the information received by said computer includes a preferred carrier, and said search is qualified with the preferred carrier information.

9. The apparatus of claim 7, wherein the information received by said computer includes flexibility in dates of travel, and said search encompasses the indicated flexibility.

10. The apparatus of claim 7, wherein said program continues the search for a predetermined number of days when a first search has failed to find a flight that is at least equal to said target price, and performs the steps of automatically booking and informing the consumer when a such a flight is found during a continued search.

11. The apparatus of claim 7, wherein said program informs said consumer by sending an e-mail notification to the consumer.

12. The apparatus of claim 7, wherein said computer is a server on the Internet.

13. A method of purchasing an airline ticket, comprising the steps of:

entering into a computer information describing a flight desired by a consumer, including a target price;

performing a search on an airline reservation system database for flights corresponding to said desired flight information;

determining whether a flight found during the search has a fare that is at least equal to said target price;

when no flights having fares at least equal to said target price have been found, periodically performing the search over a predetermined number of days, and informing the consumer of the results of each search;

automatically booking a flight found to be at least equal to said target price to thereby reserve a seat on said flight;

booking a flight at a lowest available fare when requested by the consumer in response to a notification of the results of a continued search; and informing the consumer of the seat reservation and instructing the consumer regarding payment requirements to effect purchase of the airline ticket.

14. The method of claim 13, wherein the steps of informing comprise sending an e-mail notification to the consumer.

* * * * *